United States Patent [19]

Farkas

[11] 3,905,716

[45] Sept. 16, 1975

[54] LAWN ROLLER DEVICE

[75] Inventor: John A. Farkas, Chardon, Ohio

[73] Assignee: The Raymond Lee Organization, Inc., New York, N.Y.

[22] Filed: Apr. 25, 1974

[21] Appl. No.: 464,145

[52] U.S. Cl. .................. 404/128; 404/122; 180/20
[51] Int. Cl.² ........................................ E01C 19/26
[58] Field of Search ....... 404/122, 128, 131; 180/20

[56] References Cited
UNITED STATES PATENTS

| | | | |
|---|---|---|---|
| 1,458,751 | 923 | Gailor | 180/20 |
| 1,939,258 | 933 | Ervin | 404/122 |

*Primary Examiner*—Mervin Stein
*Assistant Examiner*—Steven Hawkins
*Attorney, Agent, or Firm*—Daniel Jay Tick

[57] ABSTRACT

A lawn roller device for a garden tractor having a pair of front wheels rotatably mounted on a front axle and a pair of rear drive wheels comprises a frame having a front end supported by the front axle and a rear end. A lawn roller is rotatably mounted in the frame at the rear end thereof in contact with the ground. An idler roller is rotatably supported in the frame spaced from the ground in parallel with and spaced from the lawn roller. A drive roller is rotatably supported in the frame spaced from the ground in parallel with and spaced from the idler roller and the lawn roller. A driving device couples the drive roller to the lawn roller in a manner whereby when the rear drive wheels of a garden tractor rest on the idler and drive rollers, the wheels drive the lawn roller in the direction of the wheels via the drive roller and the driving device.

4 Claims, 2 Drawing Figures

PATENTED SEP 16 1975 3,905,716

LAWN ROLLER DEVICE

Description of the Invention

The present invention relates to a lawn roller device. More particularly, the invention relates to a lawn roller device for a garden tractor having a pair of front wheels and a pair of rear drive wheels.

Objects of the invention are to provide a lawn roller device for a garden tractor, which device is of simple structure, inexpensive in manufacture, installable on and removable from new and existing garden tractors with facility and convenience and which applies the weight of the tractor onto the lawn roller thereby providing efficient, effective and reliable lawn rolling.

Figure 1:
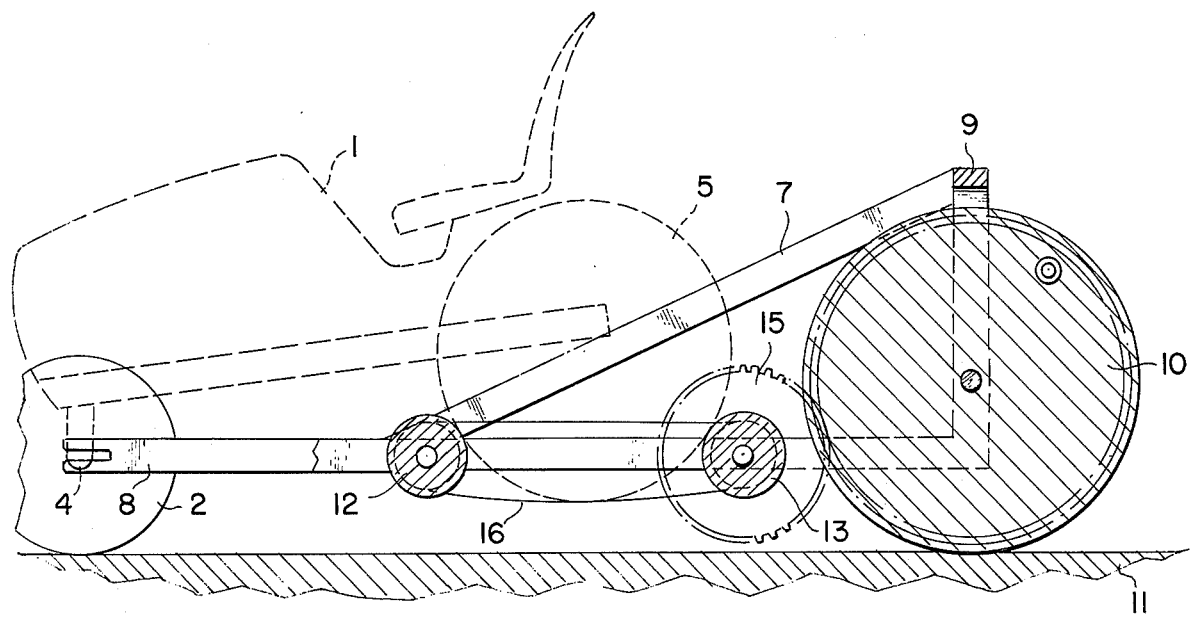
Figure 2:
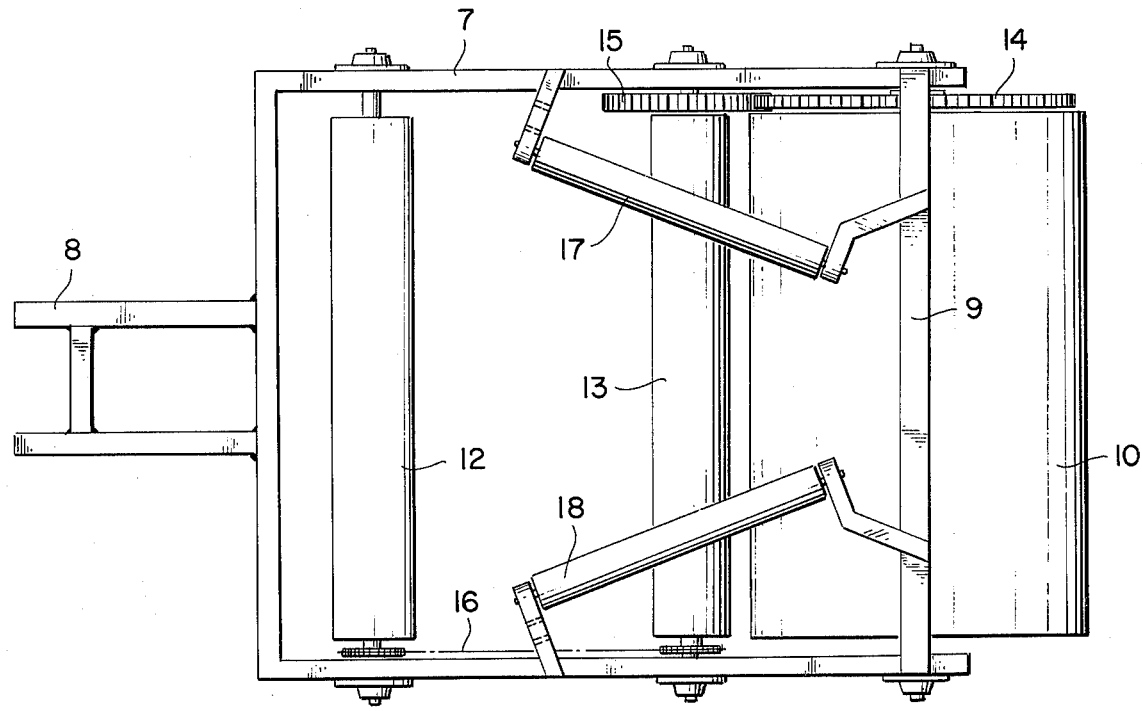

In order that the invention may be readily carried into effect, it will now be described with reference to the accompanying drawing, wherein:

FIG. 1 is a side view, partly in section, of an embodiment of the lawn roller device of the invention; and FIG. 2 is a top view of the embodiment of FIG. 1.

In the FIGS., the same components are identified by the same reference numerals.

The lawn roller device of the invention is for a garden tractor 1 having a pair of front wheels 2 and 3 (not shown in the FIGS.) rotatably mounted on a front axle 4 and a pair of rear drive wheels 5 and 6 (not shown in the FIGS.), as shown in FIG. 1.

The lawn roller device of the invention comprises a frame 7 having a front end 8 supported by the front axle 4 of the tractor 1 and a rear end 9.

A lawn roller 10 is rotatably mounted in the frame 7 at the rear end 9 thereof in contact with the ground 11 (FIG. 1).

An idler roller 12 is rotatably supported in the frame 7 spaced from the ground 11 in parallel with and spaced from the lawn roller 10.

A drive roller 13 is rotatably supported in the frame 7 spaced from the ground in parallel with and spaced from the idler roller 12 and the lawn roller 10 and intermediate the idler and lawn rollers.

A driving device couples the drive roller 13 to the lawn roller 10 in a manner whereby when the rear drive wheels 5 and 6 of the garden tractor 1 rest on the idler and drive rollers 12 and 13, the wheels drive the lawn roller in the direction of the wheels via the drive roller and the driving device. The driving device preferably comprises a gear wheel 14 (FIG. 2) coaxially affixed to the lawn roller 10 and a gear wheel 15 coaxially affixed to the drive roller 13 engaging the gear wheel 14.

A chain or drive chain 16 links the idler and drive rollers 12 and 13 in order to increase the traction. A pair of support rollers 17 and 18 (FIG. 2) are mounted at the top of the frame 7 in angular relation to each other for maintaining the rear wheels 5 and 6 of the tractor 1 centered on the idler and drive rollers 12 and 13.

While the invention has been described by means of a specific example and in a specific embodiment, I do not wish to be limited thereto, for obvious modifications will occur to those skilled in the art without departing from the spirit and scope of the invention.

I claim:

1. A lawn roller device for a garden tractor having a pair of front wheels rotatably mounted on a front axle and a pair of rear drive wheels, said lawn roller device comprising
   a frame having a front end supported by the front axle and a rear end;
   a lawn roller rotatably mounted in the frame at the rear end thereof in contact with the ground;
   a single idler roller rotatably supported in the frame and extending across the frame spaced from the ground in parallel with and spaced from the lawn roller, said idler roller being positioned between and spaced from the front end of the frame and the lawn roller;
   a drive roller rotatably supported in the frame spaced from the ground in parallel with and spaced from the idler roller and the lawn roller, said drive roller being intermediate the idler roller and the lawn roller; and
   driving means coupling the drive roller to the lawn roller in a manner whereby when the rear drive wheels of a garden tractor rest on the idler and drive rollers the wheels drive the lawn roller in the direction of the wheels via the drive roller and the driving means.

2. A lawn roller device as claimed in claim 1, wherein the driving means comprises a gear wheel coaxially affixed to the lawn roller and a gear wheel coaxially affixed to the drive roller engaging the gear wheel on the lawn roller.

3. A lawn roller device as claimed in claim 1, further comprising a drive chain linking the idler and drive rollers.

4. A lawn roller device as claimed in claim 1, further comprising support means mounted in the frame for maintaining the rear wheels centered on the rollers.

* * * * *